United States Patent [19]
Marique et al.

[11] Patent Number: 5,597,394
[45] Date of Patent: Jan. 28, 1997

[54] PROCESS FOR THE MANUFACTURE OF A FLAT GLASS SHEET WITH IMPROVED CHARACTERISTICS

[75] Inventors: Jean C. Marique, Sambreville, Belgium; Pier P. Boattini, Vasto, Italy

[73] Assignee: Società Italiana Vetro - SIV - S.p.A., San Salvo CH, Italy

[21] Appl. No.: 348,976

[22] Filed: Nov. 28, 1994

[30] Foreign Application Priority Data

Nov. 30, 1993 [IT] Italy .................................. RM93A0797

[51] Int. Cl.⁶ .................................................. C03B 35/00
[52] U.S. Cl. .................................... 65/25.2; 65/84; 65/90; 65/95
[58] Field of Search .................... 65/25.1, 25.2, 65/25.3, 60.1, 84, 90, 95, 99.1, 99.2, 182.2; 427/106, 107, 109

[56] References Cited

U.S. PATENT DOCUMENTS

| | | | |
|---|---|---|---|
| 3,506,422 | 4/1970 | Walters et al. | 65/25 |
| 4,081,260 | 3/1978 | Glikman et al. | 65/30.1 |
| 4,293,594 | 10/1981 | Yoldas et al. | 427/107 |
| 5,093,196 | 3/1992 | Hecq et al. | 65/60.1 |

FOREIGN PATENT DOCUMENTS

| | | |
|---|---|---|
| 1807582 | 5/1970 | Germany . |
| 1197258 | 7/1970 | United Kingdom . |
| 1555360 | 11/1979 | United Kingdom . |
| 1555359 | 11/1979 | United Kingdom . |
| 92/16466 | 10/1992 | WIPO . |

OTHER PUBLICATIONS

Soviet Inventions Illustrated, Section Ch, Week 8311, Apr. 27, 1983.
Soviet Inventions Illustrated, Section Ch, Week 8318, Jun. 15, 1983.

Primary Examiner—Donald E. Czaja
Assistant Examiner—Calvin Padgett
Attorney, Agent, or Firm—Wenderoth, Lind & Ponack

[57] ABSTRACT

A flat glass sheet is manufactured using the float process. Before annealing of glass carried on rollers, the glass is conveyed by a fluid bed formed by a mixture of gases, in order to cool the glass to approximately 600° C. before it reaches an annealing lehr.

5 Claims, 3 Drawing Sheets

PROCESS FOR THE MANUFACTURE OF A FLAT GLASS SHEET WITH IMPROVED CHARACTERISTICS

BACKGROUND OF THE INVENTION

1. Field of the Invention

The present invention relates to a process for the manufacture of flat glass sheets with improved optical and mechanical characteristics.

In particular, the invention relates to an improvement in the transfer operation of a glass sheet strip from a molten metal tin bath to a roller annealing lehr during a process of manufacturing flat glass sheets using the "float" method, known in the art.

2. Description of the Prior Art

It is a known fact that flat glass sheets are manufactured in plants providing a first stage in which raw materials are melted and a subsequent stage in which a glass sheet is formed by floating and sliding the molten material on a tin bath. These plants, known in the art as float plants, provide an annealing lehr downstream of the molten tin bath in order to provide the glass sheet strip with required mechanical characteristics.

PCT patent application No. 92/16466 filed by the GLASSTECH company describes a float plant equipped with an annealing lehr in which a glass sheet strip travels while being supported on a fluid bed. The aim of this device is to provide an annealing process in which the glass sheet strip does not come into contact with rollers, as is the case in the conventional method, in order to improve the optical and mechanical characteristics of the glass surface itself. Thus, the glass surface at this stage still is at a high temperature and could be damaged if it comes into contact with rollers.

A main inconvenience of the above described device is the fact that it is necessary to carry out expensive modifications to existing systems, as the integral replacement of the annealing lehr which is several dozen meters long becomes necessary. Another inconvenience is that when manufacturing a new float plant, the realization of an annealing lehr having an entirely fluid bed requires high investment, and furthermore process control is difficult.

SUMMARY OF THE INVENTION

The aim of the present invention is to overcome the above mentioned problems.

It has been surprisingly found that an identical improvement in the optical and mechanical characteristics of the glass sheet strip surface is obtained by placing between the tin bath and the traditional annealing lehr entrance, equipped with conveying rollers, a device that generates a fluid bed which serves to cool the glass sheet strip and to support it adequately as it travels towards the next roller annealing lehr.

An object of the present invention is therefore to provide a process for manufacturing glass sheets with improved optical and mechanical properties, employing a furnace for melting raw materials, a tin bath for the formation of the glass sheet strip and an annealing lehr equipped with rollers to convey the glass sheet strip. Between the molten tin bath and the roller annealing lehr is provided a stage during which the glass sheet strip is pre-cooled and conveyed on a fluid bed in order to obtain a controlled lowering of the glass temperature itself by the cooling and supporting action of mixtures of gases.

This process reinforces the surface of the glass, preventing it from being damaged by subsequent contact with the rollers, and allowing the next annealing operation to be performed in a conventional roller lehr without the danger of damaging the surface of the glass and the reduction of optical features.

In the present invention the fluid bed is formed by suitable mixtures of gases, at controlled temperatures and flow rates, in order to allow the glass sheet strip to reach the entrance to the roller annealing lehr at a temperature not exceeding approximately 570° C. (±10° C.), whatever the temperature of the glass upon exiting the tin bath. It is preferred that the temperature of the glass upon entering the device according to the present invention be between 650° C. and 600° C., according to the thickness of the glass and the speed at which it is conveyed, so that a thermal head from 600°–650° C. upon entering the device and 570° C. upon leaving it can be obtained and controlled by the temperature and flow rate of the gases in the fluid bed. The annealing of the glass sheet strip by the gradual lowering of the temperature from approximately 570° C. to approximately 495° C. is then performed as usual in the annealing lehr equipped with rollers.

The device used to carry out the process which is the object of the present invention is preferably made up of two or more modules, independent of each other, provided with gas nozzles to emit the gases and create the fluid bed. Such nozzles are positioned above and below the level of the glass sheet strip, and are divided into groups the flow rates of which can be independently adjusted so as to adapt to the different sizes and degrees of flatness of the strip of glass.

The advantage of this device is that it is divided into two parts relative to the direction of travel of the glass sheet strip. The first part provides a fluid bed made up of a mixture of hydrogen and nitrogen, in which the hydrogen is between 4 and 8% of the nitrogen. The second part provides a mixture made up of air and SO2, in which the SO2 is present in a percentage ranging between 10 and 12% with respect to the air.

Advantageously the same device can also be used to deposit thin layers on one or both the surfaces of the glass. In this case the fluid bed of the second part, as defined above, is made up of a mixture of air and organic metal elements (for example Ti, Fe, Sn, Sb, Co, Zn, Zr, Si, etc.) suitably prepared for chemical vapor phase deposition.

Furthermore, the device can also be advantageously used to improve cohesion between the glass substrate and the thin layer, by providing for emission of suitably chosen mixed gases (for example in this case a mixture of fluorine and sulphur dioxide will be used in the first part, and a mixture of air and organic metal elements in the second part).

In other words, the process and the device described above and forming the object of the present invention allow a number of technical problems to be solved simultaneously. Improvement of the optical and mechanical characteristics of the glass surface, thin layer deposition, cohesion improvement between the surface of the substrate and the thin layers deposited thereon, while also giving the advantage of notably reducing installation costs, all can be achieved by use of a single, multi-purpose device. This is possible due to the fact that the device is installed in the area between the tin bath and the annealing lehr.

BRIEF DESCRIPTION OF THE DRAWINGS

Additional characteristics and details of the invention will be described below with reference to the accompanying drawings, given merely as non-limiting examples, in which a preferred embodiment of the present invention is explained, and in which.

DETAILED DESCRIPTION OF THE INVENTION

Figure 1:
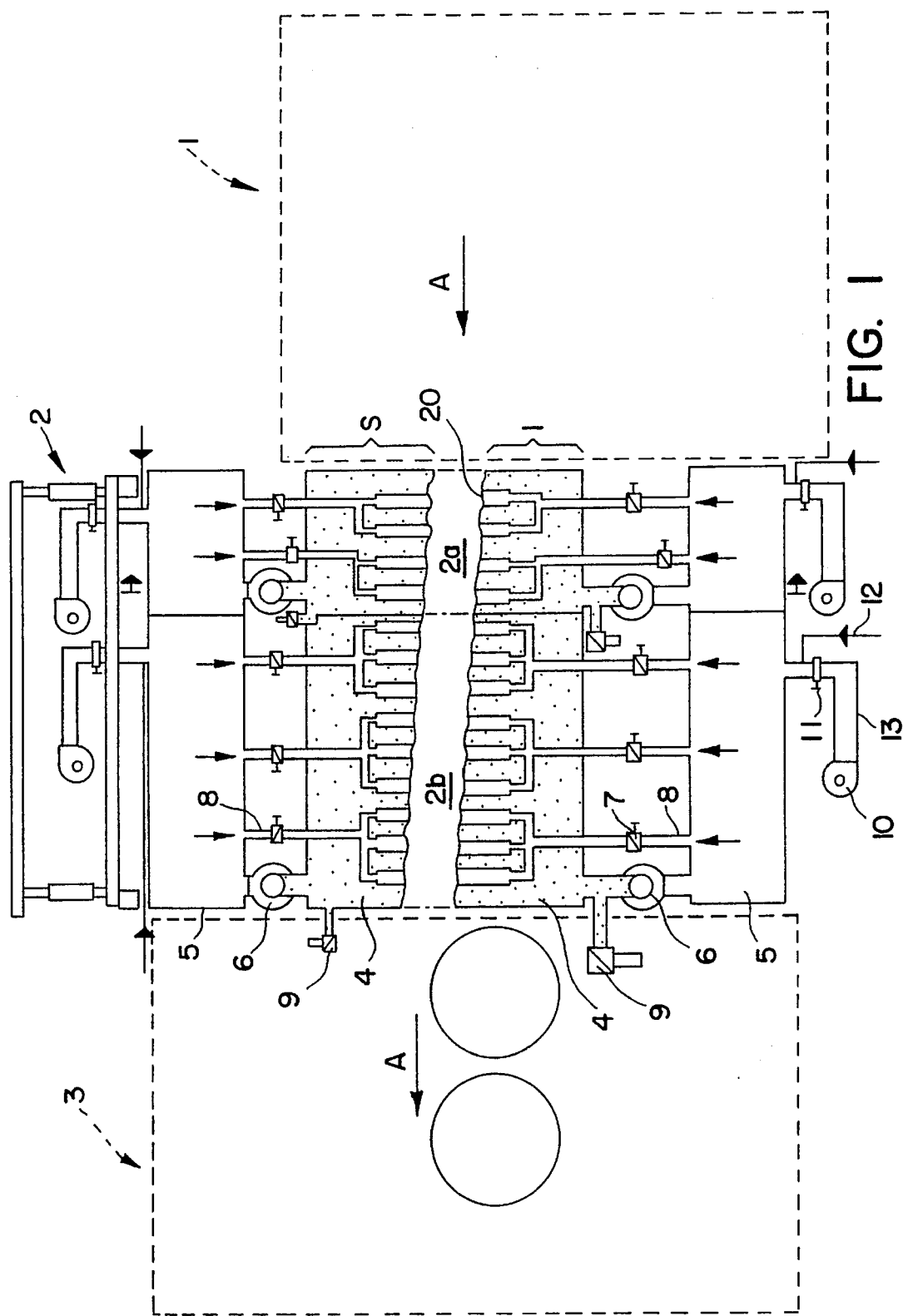
FIG. 1 is a vertical sectional view of a device for carrying out the process in accordance with the present invention.
Figure 2:
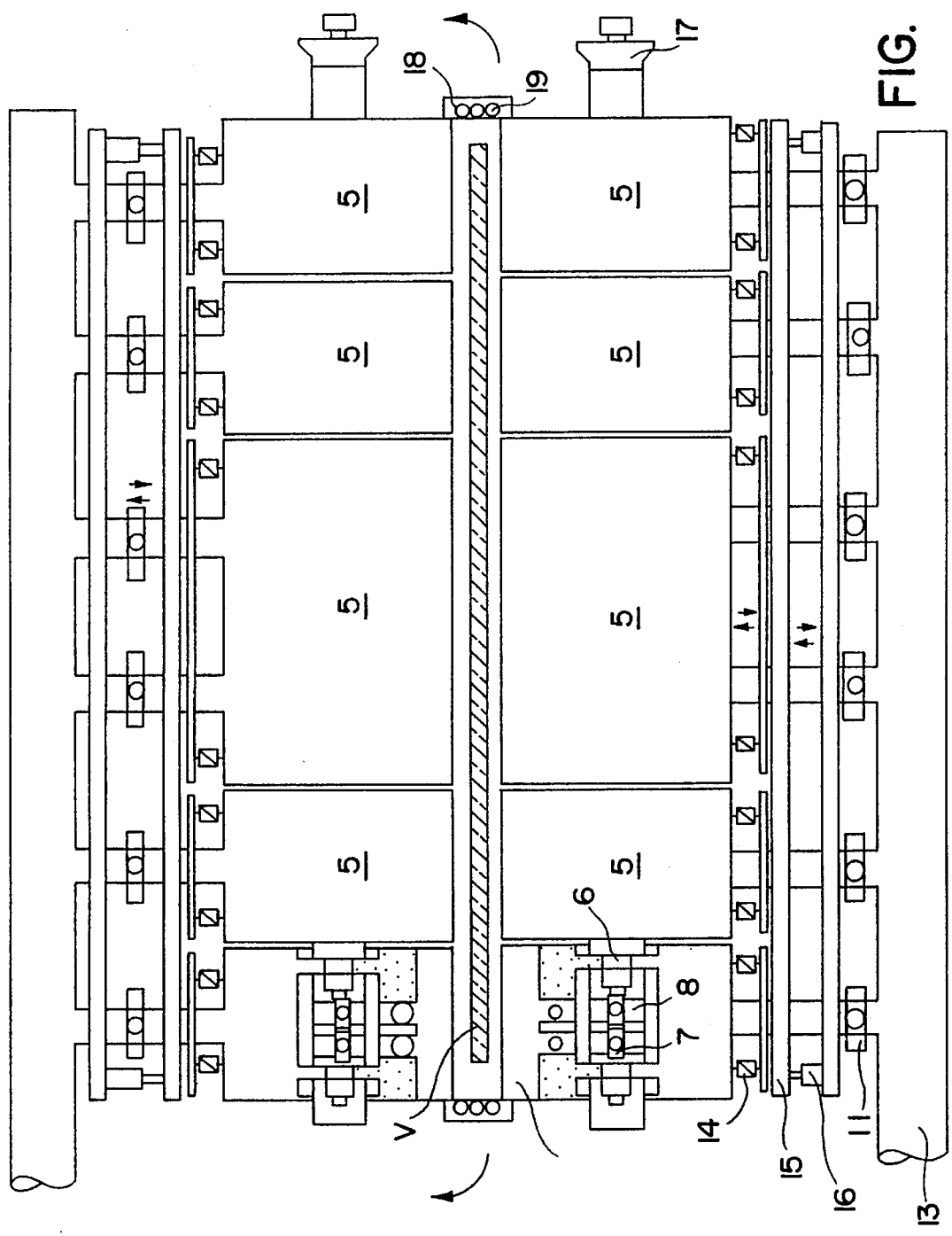
FIG. 2 is a vertical cross-sectional view of the device.
Figure 3:
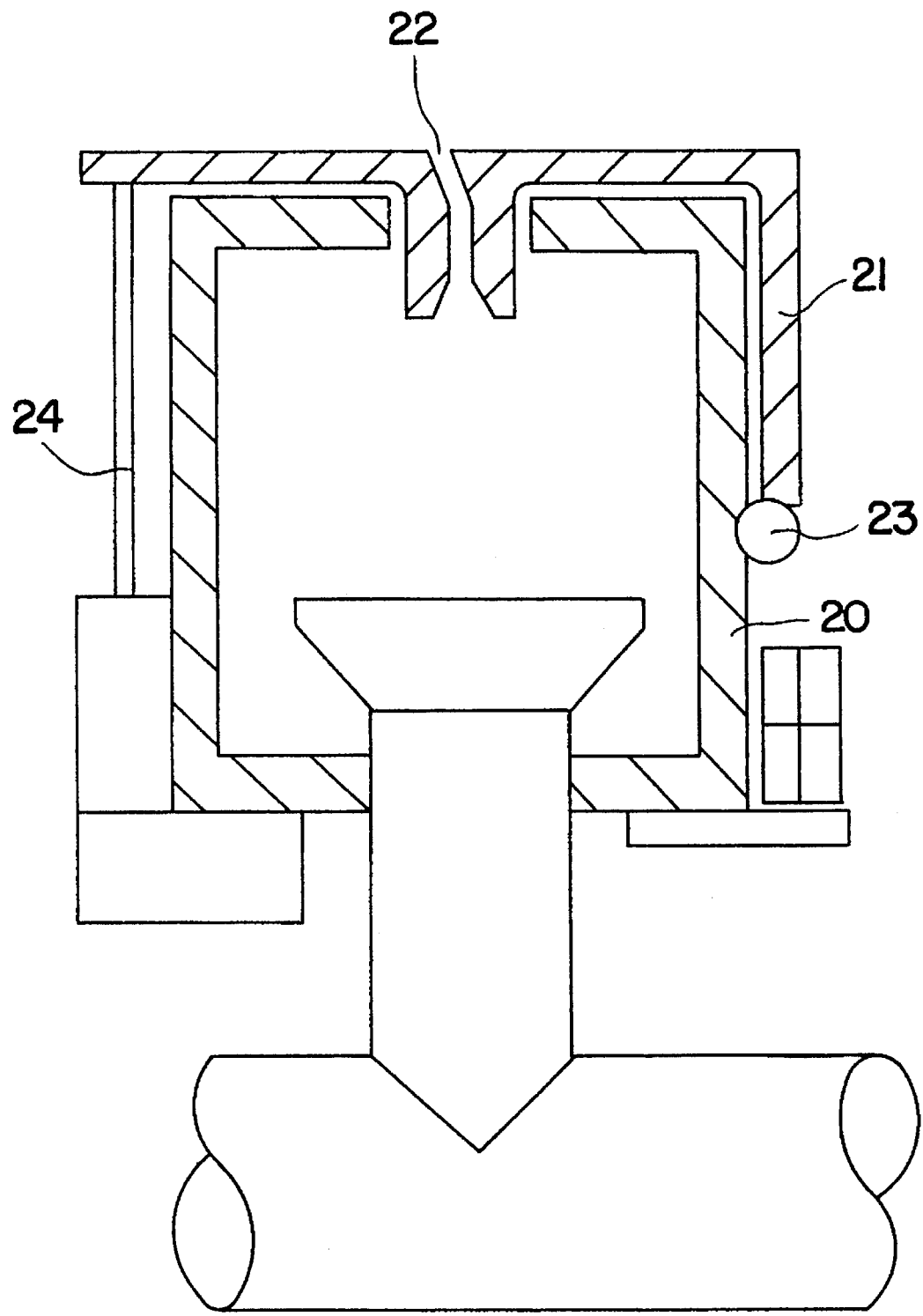
FIG. 3 is a vertical sectional view of a blowing nozzle.

With reference to FIGS. 1 to 3 and according to the present invention, a device 2 is positioned between a tin bath 1 and a roller annealing lehr 3. The direction of travel of a glass sheet strip V is indicated by arrow A. The device 2, as shown in FIG. 1, is made up of two sections, i.e. an upstream section 2a closest to the tin bath 15 and having a length not exceeding 500 millimeters, and a following downstream section 2b having a length not exceeding 1000 millimeters. The device is divided into two sections so that it can operate with different gas mixtures, and in addition, in case of malfunction in one of the two sections, to enable the faulty section to be removed, while continuing to work with the other one.

Two modules, i.e. an upper module S and a lower module I, relative to the travelling level of the glass strip, make it possible to use suitable gas mixtures, at suitable temperatures, on each of respective opposite sides of the glass strip. Each module has a tank 4 for re-circulation of a gas mixture and a tank 5 for preparation of the gas mixture and distribution thereof through conduits 8 to form a fluid bed. Re-circulation fans 6 cause the gas mixture to flow from the re-circulation tank 4 to the preparation and distribution tank 5. Each conduit 8 has an adjustment valve 7 to adjust the flow rate of the gases in the fluid bed.

A temperature adjuster 9 is positioned between the recirculation tank 4 and the distribution tank 5 to maintain the temperature of the fluid bed at a desired level, in order to control the thermal gradient of the glass sheet strip during its travel from the tin bath to the annealing lehr 3. A fan 10, connected by conduit 13 to a valve 11 and a respective tank 5, maintains the flow rate of the fluid at the desired level. Feeder pipes 12 supply the gas necessary to form the gas mixture for the fluid bed.

The tanks 5 are supported by jacks 14 resting on plates 15 which in turn rest on jacks 16, so that the group of tanks 4 and 5, which are integral with each other, can be lowered or raised with respect to the level of glass sheet strip, according to need. As can be seen from FIG. 1, the device seen in cross-section and the fluid bed generated thereby are inclined when compared to the horizontal by an amount preferably comprised between 1.2° and 5°.

With reference to FIG. 2, the group of tanks 4 and 5, which are integral with each other, is preferably divided into modules having different widths, which decrease from the center of the glass sheet strip V outwardly, in order to allow greater flexibility of adjustment in the peripheral areas of the glass strip V where temperature distribution is less than in the central areas thereof.

Cooling fans 17 are used to maintain the fans 6 recycling the fluid bed at a constant temperature. The sides of the device are closed by using moving doors 18 provided with heating elements 19 to compensate any heat loss at the edges.

Nozzles generating the fluid bed are shaped so that they allow the glass strip V to be supported on one side, and optional chemical vapor phase deposition of metal oxides to form thin layers on the other side. In particular, distribution of the mixture takes place by means of nozzles 20. These nozzles are arranged in the module I below the module S above the glass sheet strip, so that deposition can take place on the upper or lower surfaces of the strip of glass. Each nozzle 20 has a coating 21 of refractory material, in which a slot 22 for emission of the gaseous mixture is formed (see FIG. 3). Slot 22 is inclined in the same direction as the direction of movement of the glass sheet strip, in order to reduce gas turbulence to a minimum and thus allow the best possible conditions for chemical deposition of thin layers. The block of refractory material 21 is in turn hinged around hinge 23 and undergoes the thrust of a piston 24. This piston, according to requirements, alters the inclination of the refractory material block, and thus of the slot 22, with respect to the horizontal.

We claim:

1. A process for the manufacture of a flat glass sheet including forming a glass sheet strip at a molten tin bath, conveying said glass sheet strip from said molten tin bath in a direction of travel by an annealing lehr having rollers, and precooling said glass sheet strip while supporting said glass sheet strip by a fluid bed at a stage of travel of said glass sheet strip between said molten tin bath and said annealing lehr, said precooling and supporting comprising:

forming a first, upstream section of said fluid bed, relative to said direction of travel, from a first gas mixture;

forming a second, downstream section of said fluid bed, relative to said direction of travel, from a second gas mixture; and separately supplying said first gas mixture to said first section and said second gas mixture to said second section from respective first and second supplies that are separate and not in direct fluid communication.

2. A process according to claim 1, wherein during said pre-cooling stage the temperature of said glass sheet strip is reduced from a level of between 650° C. and 600° C. to a level of between 580° C. and 560° C. during a length of travel of approximately 1500 mm.

3. A process according to claim 1, wherein said first gas mixture comprises nitrogen and between 4% and 8% hydrogen, and said second gas mixture comprises air and between 10% and 12% sulphur dioxide.

4. A process according to claim 1, wherein said first gas mixture comprises nitrogen and between 4% and 8% hydrogen, and said second gas mixture comprises air and organic metal elements to form by chemical vapor phase deposition a thin layer on at least one surface of said glass sheet strip.

5. A process according to claim 1, wherein said first gas mixture comprises fluorine and sulphur dioxide, and said second gas mixture comprises air and organic metal elements to form a thin layer on said glass sheet strip and to improve cohesion therebetween.

* * * * *